(12) United States Patent
Tatge

(10) Patent No.: US 7,996,660 B2
(45) Date of Patent: Aug. 9, 2011

(54) SOFTWARE CONTROLLED CPU PIPELINE PROTECTION

(75) Inventor: Reid Edmund Tatge, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1000 days.

(21) Appl. No.: 11/838,194

(22) Filed: Aug. 13, 2007

(65) Prior Publication Data

US 2009/0049280 A1 Feb. 19, 2009

(51) Int. Cl.
*G06F 9/30* (2006.01)
(52) U.S. Cl. .................. 712/229; 712/244
(58) Field of Classification Search .......... 712/229, 712/244
See application file for complete search history.

(56) References Cited

U.S. PATENT DOCUMENTS

| 6,182,203 | B1 | 1/2001 | Simar et al. |
| 6,360,315 | B1 | 3/2002 | Potter |
| 6,810,475 | B1 | 10/2004 | Tardieux |
| 2007/0022277 | A1* | 1/2007 | Iwamura et al. ............. 712/229 |

OTHER PUBLICATIONS

Qiao-yan et al.; "A Data Hazard Detection Method for DSP With Heavily Compressed Instruction Set"; 2004; IEEE.*

* cited by examiner

*Primary Examiner* — Chun-Kuan Lee
*Assistant Examiner* — Benjamin Geib
(74) *Attorney, Agent, or Firm* — Robert D. Marshall, Jr.; W. James Brady; Frederick J. Telecky, Jr.

(57) ABSTRACT

A processor in a digital system executes instructions in an instruction execution pipeline. The processor detects a pipeline protection directive while executing instructions and sets a pipeline protection mode in accordance with the directive. The processor then continues to fetch and execute instructions in an unprotected manner if the pipeline protection mode is off and continues to fetch and execute instruction in a protected manner if the pipeline protection mode is on.

14 Claims, 6 Drawing Sheets

SOFTWARE CONTROLLED CPU PIPELINE PROTECTION

FIELD OF THE INVENTION

This invention generally relates to computer central processing units, and in particular to microprocessors and to digital signal processors.

BACKGROUND OF THE INVENTION

In early microprocessors, instruction execution was "atomic"—the processor fetched an instruction and completely executed it, then fetched another and executed it, etc. Most modern microprocessors execute instructions in several steps rather than atomically. This series of steps is called the "instruction execution pipeline", or just the "pipeline". Typically a pipeline will consist of several phases, consisting of steps to read the instruction from memory, decode the instruction, read the values to be operated on, perform the operation, and write the result to some kind of storage. This is called a "pipeline" because a processor can have several instructions executing at the same time in different phases, ie "in the pipeline". In this mode of operation, the processor can be fetching an instruction while it is decoding the previous instruction, while it is reading input values for an earlier instruction, etc. By overlapping the execution of instructions, we increase the rate at which the processor can execute instructions.

An implication of pipelining is that an instruction which is in the "read inputs" phase may need a value produced by an earlier instruction, but the "write" of that value hasn't happened yet. There are generally two ways to deal with this situation: either the processor must look for these situations and insert the appropriate stalls in the pipeline, or the programmer must arrange the instructions such that this never happens by scheduling the dependent instructions far enough apart so that the situation doesn't arise. The former solution is generally called a "protected" pipeline, and the later solution is called an "unprotected" pipeline. Almost all modern general purpose architectures implement "protected" pipelines.

Protected pipelines have the advantage that they allow the CPU designers to deepen the pipeline in subsequent generations of the processor while still properly executing legacy code. However, this requires a great deal of logic to detect situations where they must insert delays in the pipeline.

Unprotected pipelines have the advantage that they require little/no hardware to insert delays. The programmer or compiler is responsible for scheduling instructions such that instructions complete before their results are needed by subsequent instructions. Unprotected pipelines allow the use of "multiple-assignment" code, in which multiple writes to a particular register can be in the pipeline simultaneously. This is a very low-cost, low-complexity alternative to register renaming, and is critical for high performance low power digital signal processing (DSP) applications.

Existing processors are designed to have either protected or unprotected behavior.

SUMMARY OF THE INVENTION

An embodiment of the present invention detects a pipeline protection directive while executing instructions and sets a pipeline protection mode in accordance with the directive.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

There are two problems with processors with unprotected pipelines. First, there is no practical way to design a family of compatible processors with different pipeline depths. For compatibility, all processors in a compatible family must have the exact same pipeline depth. Second, for a processor with an unprotected pipeline, the programmer or compiler must insert explicit "nop" (no operation) instructions to delay the execution of instructions which, at run-time, will have input values which are generated by instructions which haven't finished writing their results (are still in the pipeline). Unfortunately, these nop's can cause significant code size growth.

For digital signal processing (DSP) applications, it is critical that the signal processing kernels are executed as fast and with as little power as possible. Therefore, for kernel code it would be best to have an unprotected pipeline. However for non-kernel code, which corresponds to the majority of code in an application, it is more important for the code size to be a small as possible. For this aspect of an application it would be best to have a protected pipeline without giving up performance. An embodiment of the present invention provides a mechanism to allow the programmer, or a compiler, to explicitly manage whether the pipeline is protected or not. A typical implementation would involve a set of instructions which enable or disable pipeline protection. An alternate implementation would use a special status register to enable or disable the protection hardware.

Many examples of processors with protected instruction execution pipelines exist. U.S. Pat. No. 6,810,475, "Processor with Pipeline Conflict Resolution using Distributed Arbitration and Shadow Registers" to Jean_Louis Tardieux describes such a processor and is incorporated by reference herein. U.S. Pat. No. 6,182,203, "Microprocessor" to Laurence R. Simar et al describes a microprocessor with an unprotected pipeline and is incorporated by reference herein.

Figure 1:
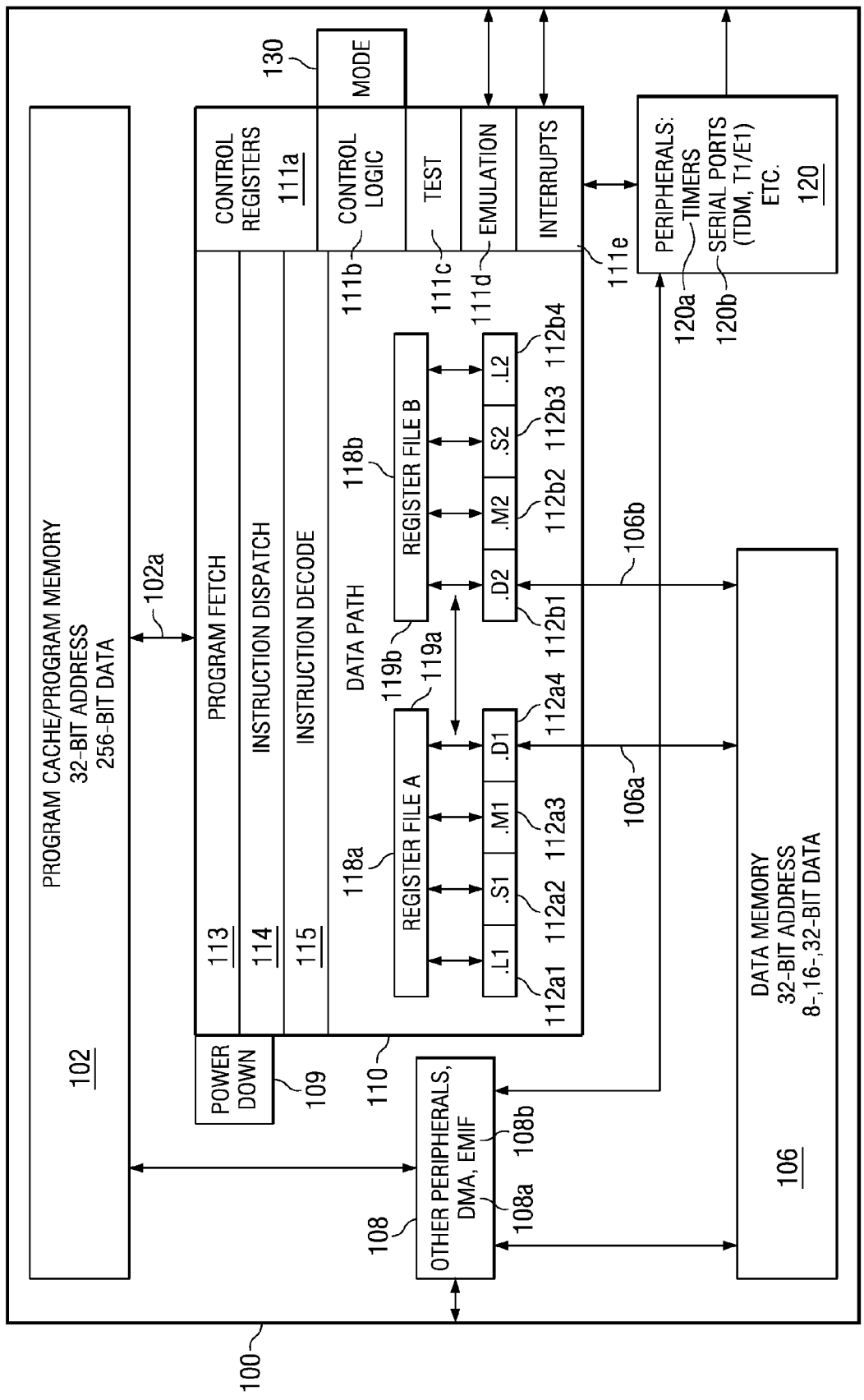
FIG. 1 is a block diagram of a representative processor that includes an embodiment of the present invention.

Referring now to FIG. 1, a high level functional block diagram of a representative microprocessor 100 that includes an embodiment of the invention is illustrated. DSP 100 is based on a central processing unit (CPU) 110, shown in the center portion of FIG. 1. DSP 100 includes program memory 102 which may be used as a program cache. Various embodiments of DSP 100 may also have varying sizes and/or types of data memory 106. Peripherals 108 such as a direct memory access (DMA) controller 108a, an external memory interface (EMIF) 108b and power-down logic 109 generally are included with the CPU, and peripherals 120 such as serial ports 120b and host ports 120a are optionally available.

The DSP has a 32-bit, byte addressable address space. Internal (on-chip) memory is organized in separate data 106 and program spaces 104. When off-chip memory is used, preferably these two spaces are unified into a single memory space via the external memory interface (EMIF) 108b.

The DSP has two internal ports 106a, 106b to access data memory 106, each with 32 bits of data and a 32-bit byte address reach. The DSP has a single port 102a to access program memory 102, with an instruction-fetch width of 256 bits and a 30-bit word (four bytes) address, equivalent to a 32-bit byte address.

Continuing to refer to FIG. 1, CPU 110 contains: a program fetch unit 113; an instruction dispatch unit 114; an instruction decode unit 115; two data paths 118a, 118b, each with four functional units L1, S1, M1 and D1 or L2, .S2, M2 and D2; 32 32-bit registers 119a, 119b; control registers 111a; control logic 111b; test support circuitry 111c, emulation support circuitry 111d, and interrupt logic 111e. The program fetch 113, instruction dispatch 114, and instruction decode 115 units can deliver up to eight 32-bit instructions from the program memory 2 to the functional units every cycle. Processing occurs in each of the two data paths (118a and 118b). Each functional unit is controlled by a 32-bit instruction. A set of control registers 111a provides the means to configure and control various processor operations.

Various embodiments of a processor within a given family may have a different number of instruction pipeline stages, depending on a particular technology and cost/performance tradeoffs. The embodiment described here is representative and will describe a seven stage pipeline, the respective stages of which will now be described with reference to Table 1 and to FIG. 2. The processor instructions are executed through a seven stage pipeline regardless of where the execution takes place (L, S, M, or D unit). In order to reduce program code size, a high level language compiler dispatches as many instructions as possible for execution in the various units in parallel. The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles.

TABLE 1

Processor Pipeline Operation

| | |
|---|---|
| P0 Pre-Fetch | Address program memory via the program address bus |
| P1 Fetch | Read program memory through the program bus. |
| P2 Decode | Read instruction buffer queue Decode instruction and Dispatch instructions to functional units |
| P3 Address | Data address computation performed in the address generators located in D unit: |
| P4 Access | Access memory operand in data memory |
| P5 Read | Read memory operand from data memory; Write memory operand address generation. |
| P6 Execute | Execute phase of data processing instructions executed in functional units. Write to registers 118. Write Memory operand to data memory |

The first stage of the pipeline is a PRE-FETCH (P0) stage 202, during which stage a next program memory location is addressed by asserting an address on the address bus of program memory 102.

In the next stage, FETCH (P1) stage 204, the program memory is read and the instruction decode unit is filled via bus 102a.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 115 in the third stage, DECODE (P2) 206, where the instruction is decoded and dispatched to the execution units for executing that instruction.

The next stage is an ADDRESS (P3) stage 208, in which the address of the data to be used in the instruction is computed, or a new program address is computed should the instruction require a program branch or jump.

In an ACCESS (P4) stage 210, the address of a read operand is generated and the memory operand is then READ from data memory 106.

The next stage of the pipeline is the READ (P5) stage 212 in which a memory operand is READ. The address of the memory location to which the result of the instruction is to be written is generated.

Finally, there is an execution EXEC (P6) stage 214 in which the instruction is executed in the various functional units 112a1-a4, b1-b4. The result is then stored in a data register or accumulator, or written to memory for Read/Modify/Write instructions. Additionally, shift operations are performed on data in accumulators during the EXEC stage.

Processor 100's pipeline can be operated in both a protected mode and in an unprotected mode, as will be described in more detail below. This significantly improves the application code size since no NOP's instructions have to be inserted to meet latency requirements while in protected mode since pipeline stalls are generated when data hazards are detected. It also makes the code translation from a prior generation processor to a latter generation processor much easier. However, for signal processing kernels that must operate at best performance, pipeline protection is turned off and instruction code is executed that has been prescreened to eliminate data hazards.

Protected pipeline mode will now be described. A pipeline protection basic rule used in processor 100 is as follows: if a write access has been initiated before the on going read access but not yet completed and if both accesses share the same resource then extra cycles are inserted to allow the write completion and to execute a next instruction with the updated operands; but for emulation, a single step code execution must behave exactly as free running code execution.

Figure 2:
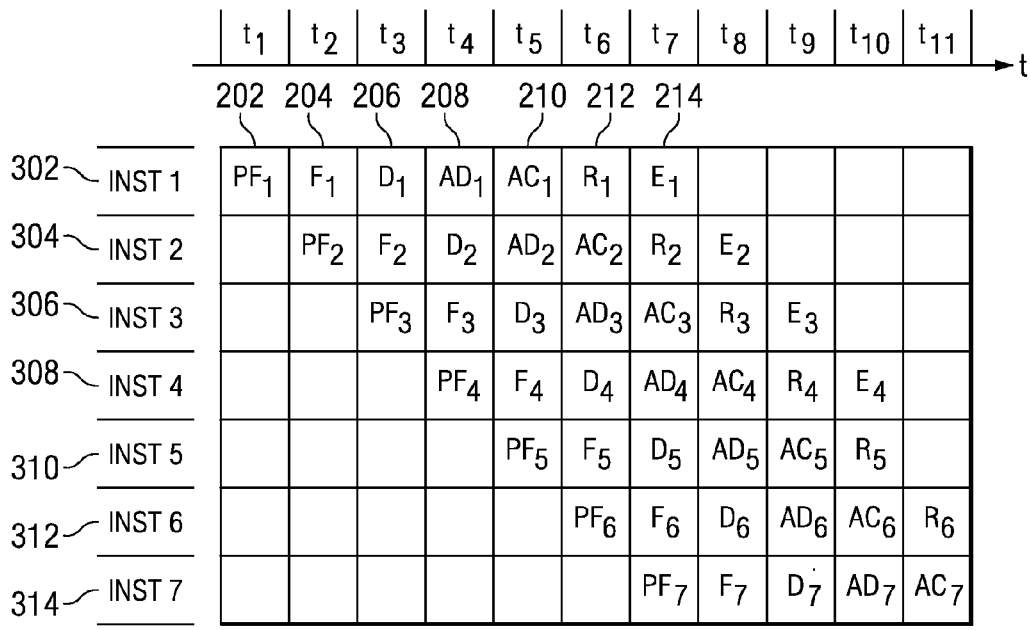
FIG. 2 shows the phases of the instruction execution pipeline of the processor of FIG. 1.

The basic principle of operation for a pipeline processor will now be described with reference to FIG. 2. As can be seen from FIG. 2, for a first instruction 302, the successive pipeline stages take place over time periods $T_1$-$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 2 for a seven stage pipeline a total of 7 instructions may be processed simultaneously. For all 7 instructions 302, 304, 306, 308, 310, 312, 314, FIG. 2 shows them all under process in time period $T_7$. Such a structure adds a form of parallelism to the processing of instructions.

FIGS. 3A, 3B, 4, 5A and 5B are timelines illustrating protected operation of the instruction execution pipeline of processor 100 during data hazard conditions. A difficulty with the operation of a pipeline is that different instructions may need to make access to the same resource. Quite often, the first instruction will be operable to modify a resource, for example a register or a part of a field of a register, and a second instruction may then need to access that resource. If the instructions were being processed separately with the processing of the second instruction only being commenced when the processing of the first instruction has finished, this would not create a conflict. However, in a pipelined architecture, there is a possibility that a second instruction could access the resource before the first instruction has finished with it, unless measures are undertaken to prevent this. Such potential conflicts are often termed "data hazards". Examples of possible data hazards are in cases of, for example:

Read after Write (e.g.: ARx=ARy followed by *ARx=k16)
Write after Read (e.g.: ARx=ARy followed by mar (ARy=P16))
Write after Write (e.g.: ARx=ARy followed by mar (ARx=P16))

Figure 3A:
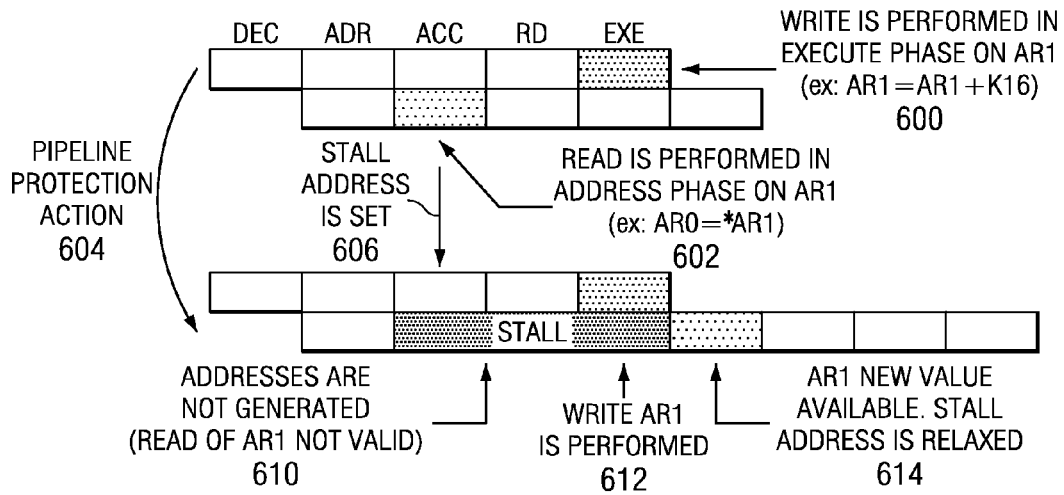

FIG. 3A represents an example of a pipeline protection action for a Read After Write (RAW). Step 600 represents a write performed by a first instruction in an execute phase (EXE) on a register AR1 (e.g. AR1=AR0+K16). Step 602 represents a read performed in the address phase (ADR) on AR1 (e.g. AC0=*AR1). Control logic 111*b* (FIG. 1) detects the hazard and initiates a pipeline protection action. A pipeline protection action (604) comprises setting a stall 606 for the address phase, whereby the addresses for the read are not generated at 610 (the read of AR1 is not valid) until after the write to AR1 is performed at 612, the new AR1 value being available and the stall for the address phase being relaxed (removed) at 614.

Figure 3B:
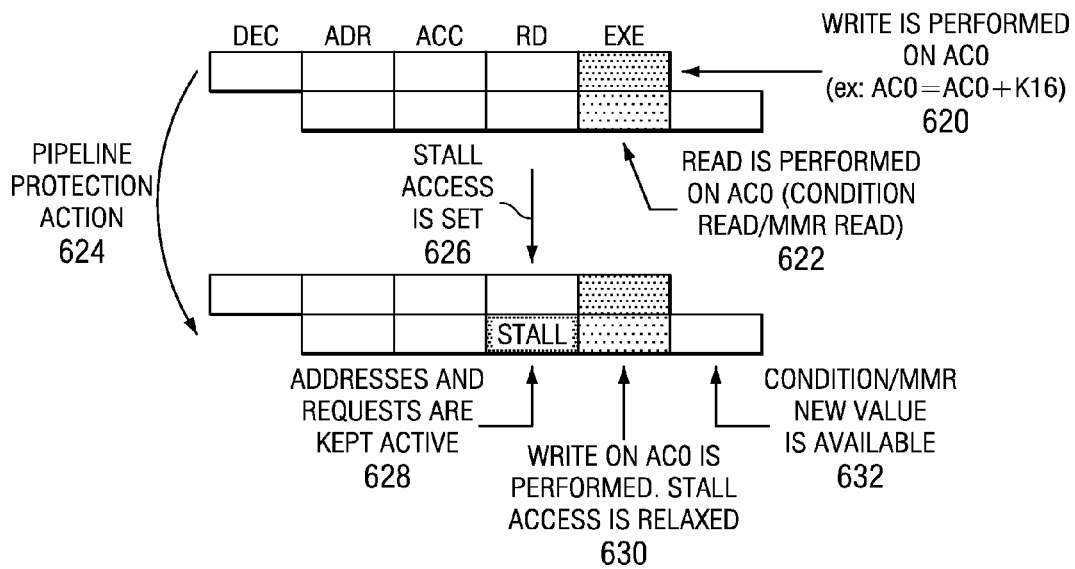

FIG. 3B represents another example of a pipeline protection action for a Read After Write (RAW). Step 620 represents a write performed by a first instruction in an execute phase (EXE) on a register AR0 (e.g. AR0=AC0+K16). Step 622 represents a read performed in the read phase (RD) on AR0 (e.g. Condition Read/Memory Mapped Register (MMR) read). Control logic 111*b* detects the hazard and initiates a pipeline protection action. A pipeline protection action (624) comprises setting a stall 626 for the access phase (ACC), by prediction, whereby the addresses and requests are kept active at 628, a write on AC0 is performed at 630 and the stall of the access phase is relaxed (removed) and the Condition/MMR new value is available at 632. Alternatively, a stall could be inserted during the read phase at 630 instead of at the access phase.

Figure 4:
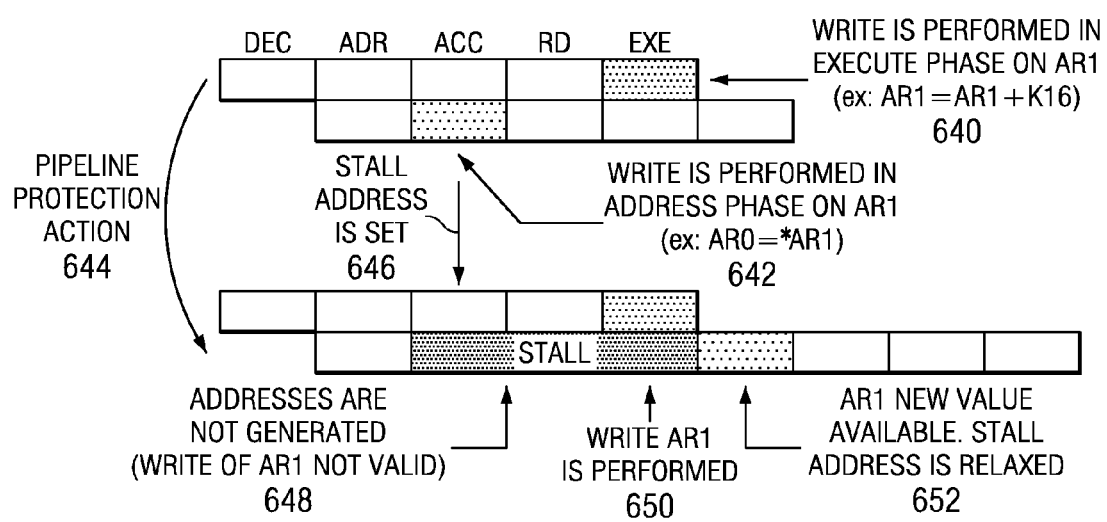
FIGS. 3A, 3B, 4, 5A and 5B are timelines illustrating protected operation of the instruction execution pipeline of the processor of FIG. 1 during data hazard conditions.

FIG. 4 represents an example of a pipeline protection action for a Write After Write (WAW). Step 640 represents a write performed by a first instruction in an execute phase (EXE) on a register AR1 (e.g. AR1=AR0+K16). Step 642 represents a write performed in the address phase (ADR) on AR1 (e.g. AC0=*AR1+). Control logic 111*b* detects the hazard and initiates a pipeline protection action. A pipeline protection action (644) comprises setting a stall 646 for the address phase, whereby the addresses for the second write to AR1 are not generated at 648 (the write to AR1 is not allowed) until after the first write to AR1 is performed at 650, the new AR1 value being available and the stall for the address phase being relaxed (removed) at 652.

Figure 5A:
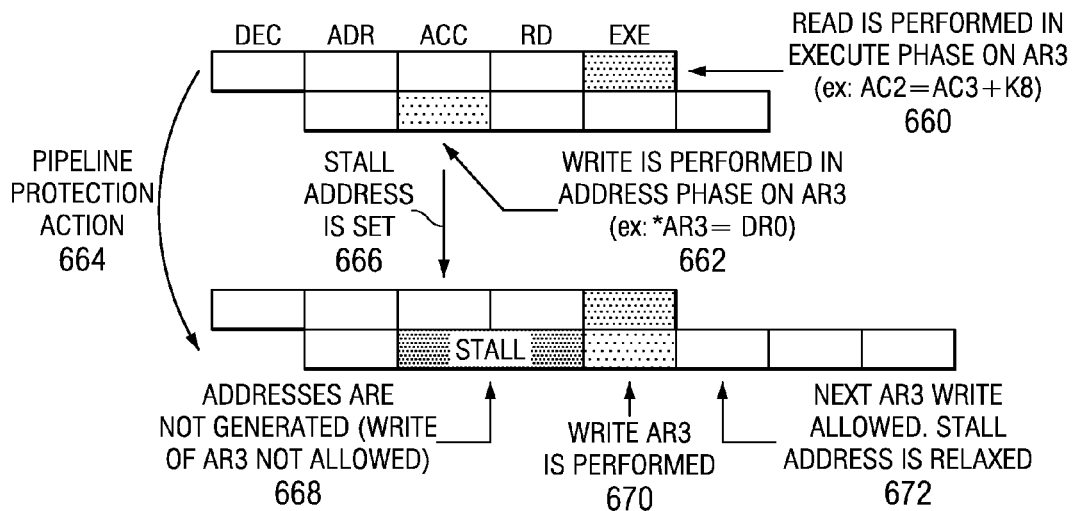

FIG. 5A represents an example of a pipeline protection action for a Write After Read (WAR). Step 660 represents a read performed by a first instruction in a execute phase (EX) on a register AR3 (e.g. AC2=AR3+K8). Step 662 represents a write performed in the address phase (ADR) on AR3 (e.g. *AR3+DR0). Control logic 111*b* detects the hazard and initiates a pipeline protection action. A pipeline protection action (664) comprises setting a stall 666 for the address phase, whereby the addresses for the write to AR3 are not generated at 668 (the write to AR3 is not allowed) until the read of AR3 is performed at 670, the AR3 write being allowed during the same phase at 670. The read and write of AR3 can be performed in the same phase at 670 because the read gets the "old" value of AR3. The stall for the address phase being relaxed (removed) at 672.

Figure 5B:
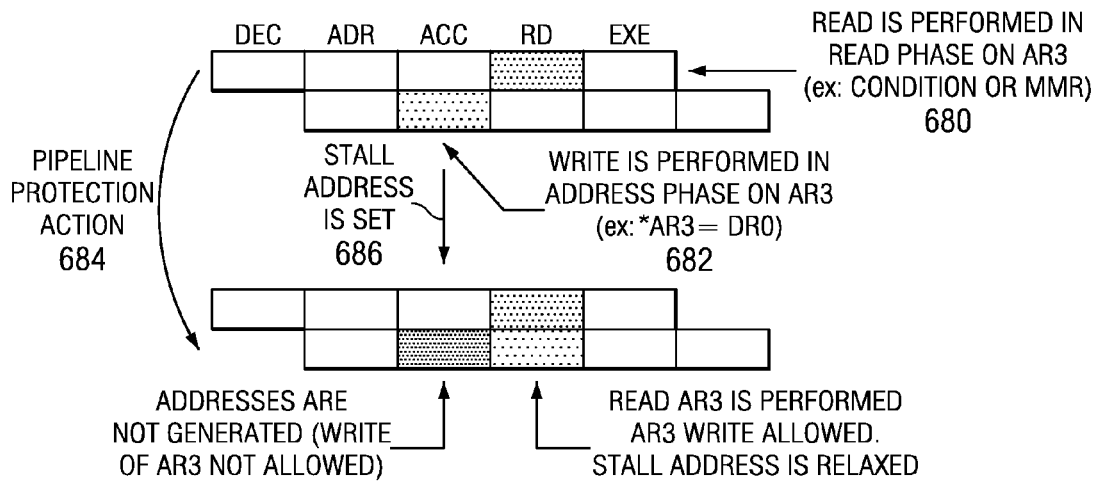

FIG. 5B represents another example of a pipeline protection action for a Write After Read (WAR). Step 680 represents a read performed by a first instruction in a read phase (RD) on a register AR3 (e.g. Condition or MMR). Step 682 represents a write performed in the address phase (ADR) on AR3 (e.g. *AR3+DR0). Control logic 111*b* detects the hazard and initiates a pipeline protection action. A pipeline protection action (684) comprises setting a stall 686 for the address phase, whereby the addresses for the write to AR3 are not generated at 688 (the write to AR3 is not allowed) until the read of AR3 is performed at 690, the write to AR3 then being allowed and the stall for the address phase being relaxed (removed).

Figure 6:
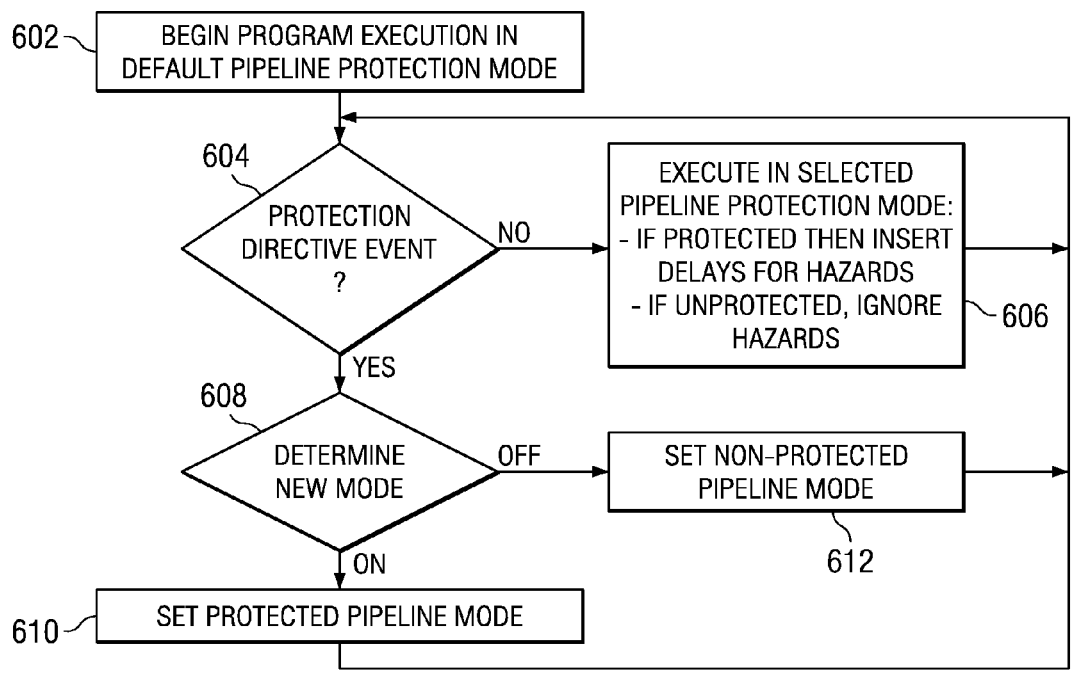
FIG. 6 is a flow diagram illustrating selective operation of pipeline protection modes for the processor of FIG. 1.

FIG. 6 is a flow diagram illustrating selective operation of pipeline protection modes for processor 100. When processor 100 first starts executing instructions 602 after being turned on, a default pipeline protection mode will be in place. Typically, the default mode will be "pipeline protection turned on" since performance is generally not an issue during start up. The instruction execution pipeline will continue to operate 606 in the default protection mode as long as nothing is done 604 to direct it to operate differently. As various applications are executed, the processor will encounter a kernel of code that needs to be executed at maximum performance. Associated with the kernel will be a directive that will indicate pipeline protection mode is to be turned off. In a first embodiment, the directive will be an instruction that is executed at the beginning of the kernel. This instruction will be decoded and determined to be a pipeline protection directive 604.

Once a directive is detected, it will be decoded 608 to determine what mode to operate in. Since a high performance kernel is being started, the directive will set the pipeline to non-protected mode and instruct the pipeline to operate in unprotected mode 612 in order to improve performance. A mode circuit 130 (FIG. 1) associated with control circuitry 110*b* will be set to inhibit the introduction of pipeline protection actions when data hazards are detected. Once placed in unprotected mode, the pipeline will continue to execute 606 in unprotected mode until another directive is received 604. While executing in unprotected mode, data hazards, such as those introduced by multiple-assignment code are ignored.

Once the high performance kernel is completed, another directive will be encountered to indicate the protection mode is to be turned on. In this embodiment, an instruction associated with the kernel will be executed at the end of the kernel. This instruction will be decoded and determined to be a pipeline protection directive event 604. In this case, the directive will be decoded 608 to determine that pipeline protection is to be turned back on. Mode circuit 130 will be set to protected mode and will allow control circuitry 110*b* to again introduce pipeline protection actions when data hazards are detected. The pipeline will commence executing instructions 610 in protected mode. Once placed in protected mode, the pipeline will continue to execute 606 in protected mode until another directive event is received 604.

In this manner, processor 100 can operate in protected mode for the bulk of the program applications that are placed in program memory 102, and operate in unprotected mode to executed specially crafted high performance applications from program memory 102 as needed.

The pipeline directive instruction may be embodied in various manners. For example, there may be a pair of instructions, one to direct protection mode be turned on and one to direct protection mode be turned off, or it may be a single instruction with an operand that is preset to indicate which mode is to be entered.

In another embodiment, rather than having a particular instruction or pair of instructions, a standard register manipulation instruction may be used to indicate which mode is to be entered. In this case, mode logic 130 may be implemented as a bit in one of the status or control registers 111a and a standard "set bit" and "clear bit" instruction are used to toggle the protection mode bit.

In some embodiments, interrupts may be disabled while protection mode is turned off so that an interrupt service routine does not execute erroneously if an interrupt occurs when protection is turned off. Alternatively, interrupt circuitry 111e (FIG. 1) is configured so that when an interrupt occurs and is serviced, the pipeline protection mode will be turned on for the interrupt service routine, but the protection mode will be preserved as part of the machine state prior to the interrupt. When the interrupt service routine is completed, the machine state will be restored and pipeline protection mode will also be restored to the mode it was in prior to the interrupt.

As discussed above, the high performance application code will need to be specially crafted in order to avoid execution pipeline data hazards. The programmer or the compiler will need to be aware of the operation of the particular pipeline for a particular embodiment of a processor that operates in unprotected pipeline mode. Instructions will need to be arranged in a sequence to avoid a data hazard, or else nop instructions will need to be inserted to mitigate the data hazard. Changes in pipeline length and operating sequence for different processor embodiments may require different arrangement of instructions to avoid data hazards or different numbers of nop instruction to mitigate hazards.

Although the invention finds particular application to Digital Signal Processors (DSPs), implemented, for example, in an Application Specific Integrated Circuit (ASIC), it also finds application to other forms of processors, microprocessors and microcontrollers. An ASIC may contain one or more megacells which each include custom designed functional circuits combined with pre-designed functional circuits provided by a design library.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Figure 7:
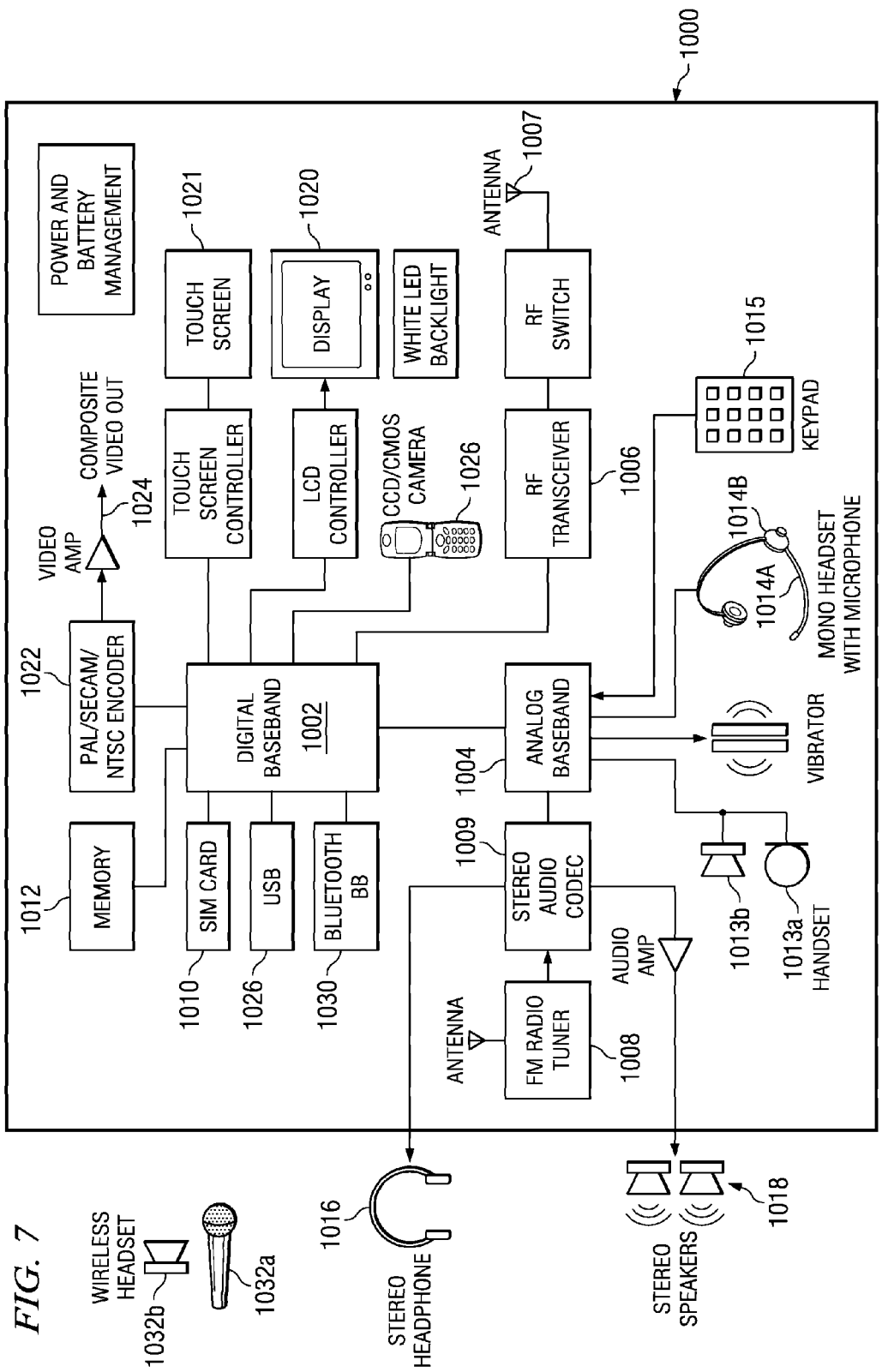
FIG. 7 is a block diagram of a digital system that includes an embodiment of the present invention.

FIG. 7 is a block diagram of a representative cell phone 1000 that includes an embodiment of the present invention. Digital baseband (DBB) unit 1002 is a digital signal processing system that includes embedded memory and security features. It includes mode circuitry and pipeline hazard detection circuitry for selective operation in protected mode and in unprotected mode, as described above.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013a and sends a voice data stream to handset mono speaker 1013b. ABB 1004 also receives a voice data stream from microphone 1014a and sends a voice data stream to mono headset 1014b. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same processor that performs DBB processing. In another embodiment, a separate DSP or other type of processor performs ABB processing.

RF transceiver 1006 includes a receiver for receiving a stream of coded data frames from a cellular base station via antenna 1007 and a transmitter for transmitting a stream of coded data frames to the cellular base station via antenna 1007.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032a and headset 1032b for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the processor may have a different arrangement and complement of registers and functional units from that shown in FIG. 1. The instruction execution pipeline may have a greater of lesser number of stages than shown in FIG. 2 and data hazards may be of different types than discussed herein.

In another embodiment, the pipeline protection mode directive may be associated with a task identification. As such, whenever a designated task is executed, the pipeline protection mode is set accordingly. For examples, it could be arranged that tasks having a number greater than a particular value would be executed in unprotected mode, while those having lower task numbers would be executed in protected mode, or visa versa. In such an embodiment, the task number would be the protection mode directive. Control logic 111b (FIG. 1) would include task ID detection circuitry for detecting the task ID of each task as instructions are fetched and it begins execution.

In another embodiment, a task or a process, for example, will include a pipeline protective directive that is activated whenever that task is executed. A task control block or other means of task context will contain the pipeline protection directive.

In another embodiment, the protection mode directive may be derived from an address space. For example, program tasks are stored in known address locations in program memory. A portion of program memory may be designated to indicate high performance code. A high performance kernel is then stored in the designated address region of program memory. When the high performance kernel is fetched from program memory, address monitoring circuitry associated with the program fetch circuitry will detect the addresses of the instructions being fetched as being in the designated region which will indicate the instruction execution pipeline should operate in unprotected mode. When the addresses of instructions being fetched is not in the designated address space, the instruction execution pipeline will operate in protected mode. Control logic 111b FIG. 1) would include fetch address detection circuitry for detecting an address range or portion of address as instructions are fetched and it begins execution. In some embodiments, the range is fixed, while in other embodiments the range is programmable so that a larger or smaller address region can be designated by control software when execution is first started after boot up, or dynamically during the course of operation.

Applications and high performance kernels written in accordance with embodiments of the invention may be stored on various types of computer readable media' for example, program memory 102 of FIG. 1. Other examples include disks or other types of hard-drives, CD ROM discs, floppy discs, or other types of soft discs, flash ROMs, USB memory sticks, etc.

It is therefore contemplated that the appended claims will cover any such modifications of the embodiments as fall within the true scope and spirit of the invention.

What is claimed is:

1. A computer system comprising a central processing unit (CPU), the CPU comprising:
    an instruction execution pipeline having a plurality of pipeline stages;
    detection circuitry for detecting a pipeline stage conflict;
    stall circuitry connected to receive a detection signal from the detection circuitry and operable to stall a portion of the instruction execution pipeline until the pipeline stage conflict is resolved;
    mode circuitry connected to the stall circuitry having a protected mode enabling the stall circuitry and a non-protected mode disabling the stall circuitry; and
    interrupt circuitry connected to the mode circuitry and responsive to receipt of an interrupt signal to
        store an indication of a current mode of the mode circuitry,
        cause the mode circuitry to enter the protected mode,
        perform an interrupt service routine corresponding to the received interrupt signal in the protected mode, and
        upon completion of the interrupt service routine restore the mode circuitry to a mode corresponding to the stored indication of current mode.

2. The CPU of claim 1, wherein the mode circuitry is operable to be placed in an enabled mode or a disabled mode in response to an instruction executed by the instruction execution pipeline.

3. The CPU of claim 1, wherein the mode circuitry is a status register that is responsive to certain instructions executed by the instruction execution pipeline.

4. The CPU of claim 1, further comprising detection circuitry operable to direct the mode circuitry be placed in an enabled mode or a disabled mode in response to a task identification number associated with an instruction being executed by the instruction execution pipeline.

5. The CPU of claim 1, further comprising detection circuitry operable to direct the mode circuitry be placed in an enabled mode or a disabled mode in response to an address associated with an instruction being executed by the instruction execution pipeline.

6. A method for executing instructions in an instruction execution pipeline, comprising:
    fetching instructions from program memory and executing them in the instruction execution pipeline;
    detecting a pipeline protection directive while executing instructions;
    setting a pipeline protection mode to on or off in accordance with the detected pipeline protection directive;
    continuing to fetch and execute instructions in an unprotected manner if the pipeline protection mode is off and continuing to fetch and execute instruction in a protected manner if the pipeline protection mode is on; and
    servicing an interrupt responsive to receipt of an interrupt signal by
        storing an indication of whether a current pipeline protection mode is on or off,
        setting the pipeline protection mode to on,
        performing an interrupt service routine corresponding to the interrupt signal with the pipeline protection mode set on, and
        upon completion of the interrupt service routine restoring the pipeline protection mode to a mode corresponding to the stored indication of current pipeline protection mode.

7. The method of claim 6, wherein detecting comprises decoding an instruction being executed in the instruction execution pipeline.

8. The method of claim 6, wherein detecting comprises setting a bit in a status register in response to an instruction being executed in the instruction execution pipeline.

9. The method of claim 6, wherein detecting comprises detecting a pipeline protection directive associated with a task that is being executed.

10. The method of claim 6, wherein detecting comprises detecting an address associated with an instruction being executed in the instruction execution pipeline that is within a defined address region.

11. The method of claim 6, wherein executing instructions in a protected manner comprises:
    detecting a data hazard associated with two or more instructions in the pipeline; and
    stalling a portion of the pipeline until the data hazard is resolved.

12. The method of claim 11, wherein executing instructions in an unprotected manner comprises ignoring any data hazard that occurs among instructions in the instruction execution pipeline.

13. A computer system comprising a central processing unit (CPU), the CPU comprising:

an instruction execution pipeline having a plurality of pipeline stages;

detection circuitry for detecting a pipeline stage conflict;

stall circuitry connected to receive a detection signal from the detection circuitry and operable to stall a portion of the instruction execution pipeline until the pipeline stage conflict is resolved;

mode circuitry connected to the stall circuitry having a protected mode enabling the stall circuitry and a non-protected mode disabling the stall circuitry; and interrupt circuitry connected to the mode circuitry and responsive to receipt of an interrupt signal to perform a service routine corresponding to the interrupt signal when the mode circuitry is in the protected mode, and disable performing a service routine corresponding to the interrupt signal when the mode circuitry is in the non-protected mode.

14. A method for executing instructions in an instruction execution pipeline, comprising:

fetching instructions from program memory and executing them in the instruction execution pipeline;

detecting a pipeline protection directive while executing instructions;

setting a pipeline protection mode to on or off in accordance with the detected pipeline protection directive;

continuing to fetch and execute instructions in an unprotected manner if the pipeline protection mode is off and continuing to fetch and execute instruction in a protected manner if the pipeline protection mode is on;

performing a corresponding interrupt service routine responsive to receipt of an interrupt signal when the pipeline protection mode is on; and not performing a corresponding interrupt service routine responsive to receipt of an interrupt signal when the pipeline protection mode is off.

* * * * *